United States Patent [19]

Roston

[11] 4,305,235
[45] Dec. 15, 1981

[54] HEAT CONSERVATION SYSTEM FOR GREENHOUSES

[76] Inventor: Wayne Roston, 4153 Park Ave. West Rte. 12, Mansfield, Ohio 44903

[21] Appl. No.: 40,974
[22] Filed: May 21, 1979
[51] Int. Cl.³ .............................................. E04B 1/34
[52] U.S. Cl. .......................................... 52/2; 52/171; 126/428
[58] Field of Search ......................... 52/171, 172, 2, 86

[56] References Cited

U.S. PATENT DOCUMENTS

| | | | |
|---|---|---|---|
| 2,830,606 | 4/1958 | Daugherty | 52/2 |
| 3,389,510 | 6/1968 | Stock | 52/2 |
| 3,481,087 | 12/1969 | Stafford | 52/2 |
| 3,903,665 | 9/1975 | Harrison | 52/171 |
| 4,021,972 | 5/1977 | Choate et al. | 52/2 |
| 4,108,373 | 8/1978 | Chiapale et al. | 126/428 |

OTHER PUBLICATIONS

Symposium on Electricity and Artificial Light in Horticulture, dated Mar. 17, 1969, 7 pp.

Primary Examiner—James L. Ridgill, Jr.
Attorney, Agent, or Firm—Hamilton, Renner & Kenner

[57] ABSTRACT

A greenhouse structure (No. 1 or No. 2) having a curved roof wall formed of two spaced-apart plastic layers (30 and 34) with troughs (32) at the lower sides thereof, and a circulation system including blowers (42,42') connecting the top of the wall and the ends of the troughs to an insulation storage receptacle (A) by means of ducts (38, 39, 40, 41, 43 and 44), whereby the roof wall chamber is selectively filled and emptied.

9 Claims, 15 Drawing Figures

HEAT CONSERVATION SYSTEM FOR GREENHOUSES

TECHNICAL FIELD

A greenhouse structure and fluid circulation system for efficiently maintaining the temperature of the enclosed space within the proper range during the nighttime and daytime for the rapid and healthful growing of plants.

BACKGROUND ART

Conventional greenhouses have long been constructed with transparent or translucent outer walls to admit the sun's rays during the daytime and utilize solar energy to promote the growth of the plants within the greenhouse. However, such outer walls allow a high degree of heat loss to the outside cooler air during the nighttime, particularly in winter when the heat differential is greatest, requiring a constant circulation of warm air to maintain the desired inner temperature.

When one considers that there are approximately 10,000 acres of greenhouses in the United States, the cost of fuel such as natural gas or oil necessary to supply heat to maintain the desired temperature in greenhouses during the nighttime, particularly in low temperature areas, is excessive, especially in view of the current shortages of such fuels.

Various devices have been proposed to reduce the heat losses in greenhouses, including curtains and shades, folding doors and special glazing methods. All of these proposals have obvious disadvantages, including maintenance expense.

Greenhouses having walls and roofs of plastic sheeting are in substantial use and the sun's rays are freely transmitted therethrough during the daytime, but in cool or freezing weather large amounts of warm air must be circulated within the enclosure in the nighttime. It has been proposed to provide an air space between two transparent walls for thermal insulation. This reduces the heat loss somewhat but not enough to effect a substantial reduction in the fuel required to supply additional heat in the nighttime in cold weather localities.

U.S. Pat. No. 4,021,972 discloses an air supported structure having an outer wall formed of an outer plastic imperforate wall and an inner plastic perforate wall with the space between the walls filled with thermal insulating material such as polystyrene beads. The walls are connected along parallel lines forming sectional chambers and the beads are blown separately into each chamber, the filled chambers forming a permanent insulated wall supported by differential air pressure maintained within the enclosed space. Obviously, this structure is not designed nor adapted to function as a greenhouse for several reasons, including the fact that the insulated wall would not transmit the sun's rays.

U.S. Pat. No. 4,108,373 discloses a method of day and night air conditioning a greenhouse having spaced inner and outer glass walls by circulating a heat transporting liquid between the walls containing an optical filter during the daytime and storing the absorbed heat in a reservoir, and then circulating the liquid during the nighttime to use the absorbed heat to maintain the desired temperature within the enclosure. Obviously, this process would require large heat storage capacity and would be expensive to operate.

U.S. Pat. No. 3,903,665 discloses a window panel for use in a building structure, said panel having rigid walls of glass or the like which are maintained in spaced-apart relation to form a chamber of fixed volume, and means for moving a granular insulating media into and out of the chamber for reducing heat loss through the panel during the nighttime and increasing energy transmission during the daytime. The operability of this system is dependent upon using rigid or semirigid window panels of relatively small size so that the insulating material can be blown into and evacuated from the chamber without serious coagulation causing obstructions at the inlet and discharge conduits.

DISCLOSURE OF INVENTION

The present invention provides a system for use with a greenhouse having an air-inflated roof wall formed by spaced-apart flexible plastic sheets, whereby the entire wall space is filled with insulation material during the nighttime to greatly reduce the supplementary heating required for temperature control, and the insulation material is removed during the daytime to obtain the full benefit of solar energy transmitted through the wall.

It is an object of the invention to provide an improved greenhouse structure and fluid circulation system to maintain controlled temperatures within the enclosure during the nighttime and the daytime.

Another and more specific object is to provide a greenhouse having a roof wall with an air space between flexible transparent plastic layers and means selectively to rapidly introduce plastic insultation particles into said air space or remove said particles therefrom.

A further object is to provide an improved fluid circulation system for rapidly introducing the insulation particles, and rapidly and completely removing all of said particles.

Another object is to provide an improved greenhouse structure which allows complete removal of the insulation particles from the entire air space regardless of adverse weather conditions such as snow loads on the roof.

A still further object is to provide an improved structure and fluid circulation system which insures complete removal of the insulation material by first forming a medial longitudinal channel through the material and then drawing the particles downwardly from the end of the channel to the bottom sides of the wall to progressively collapse the outer plastic layer of the wall as the particles are evacuated These and other objects are accomplished by the improvements comprising the present invention, a preferred embodiment of which is shown and described comprising by way of example the best known mode of carrying out the invention. Various modifications and changes in details of construction and operation are conprehended within the scope of the appended claims.

DESCRIPTION OF PREFERRED EMBODIMENT

Figure 1:
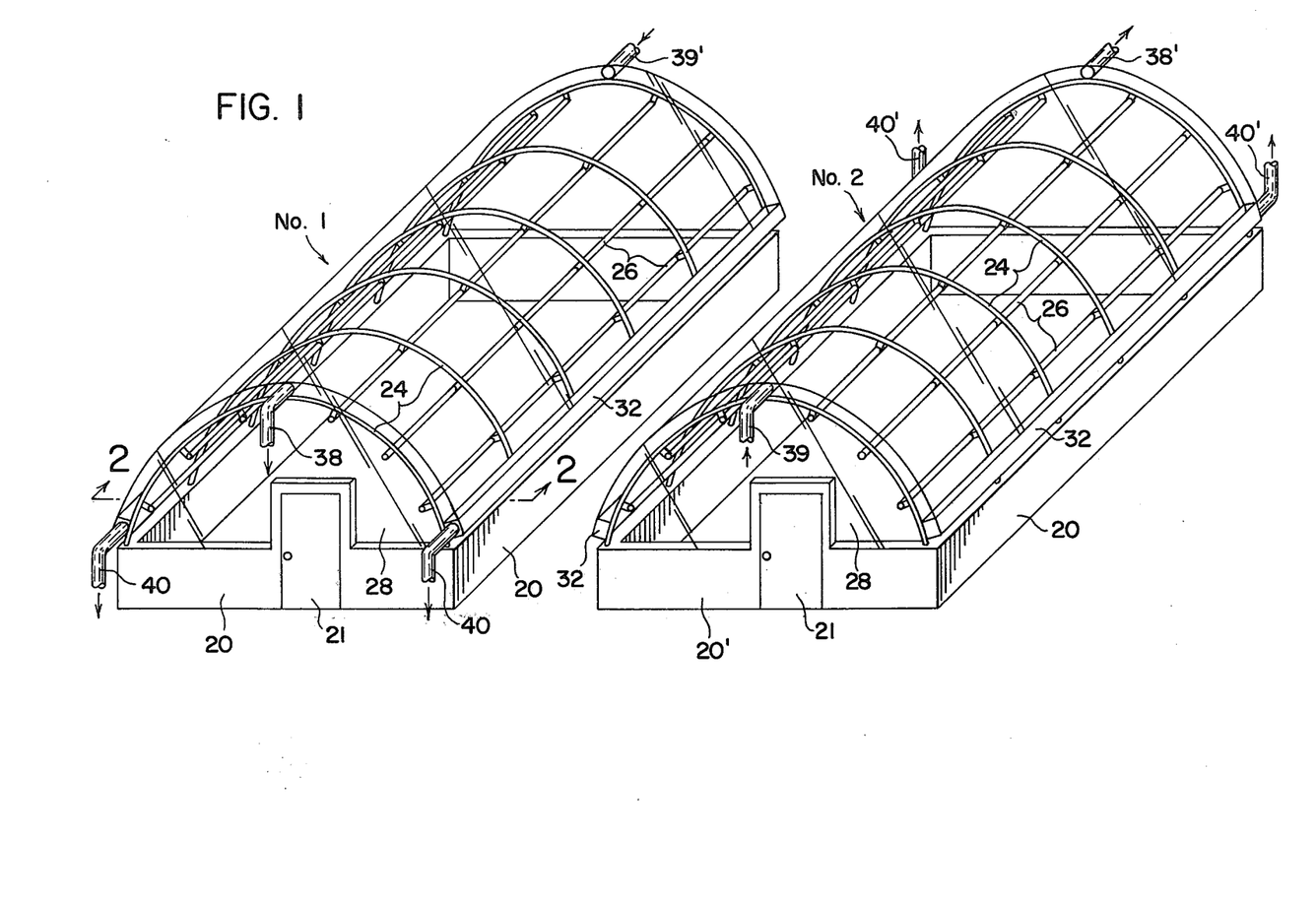
FIG. 1 is a schematic perspective view showing two of the improved greenhouses in side-by-side relation.
Figure 2:
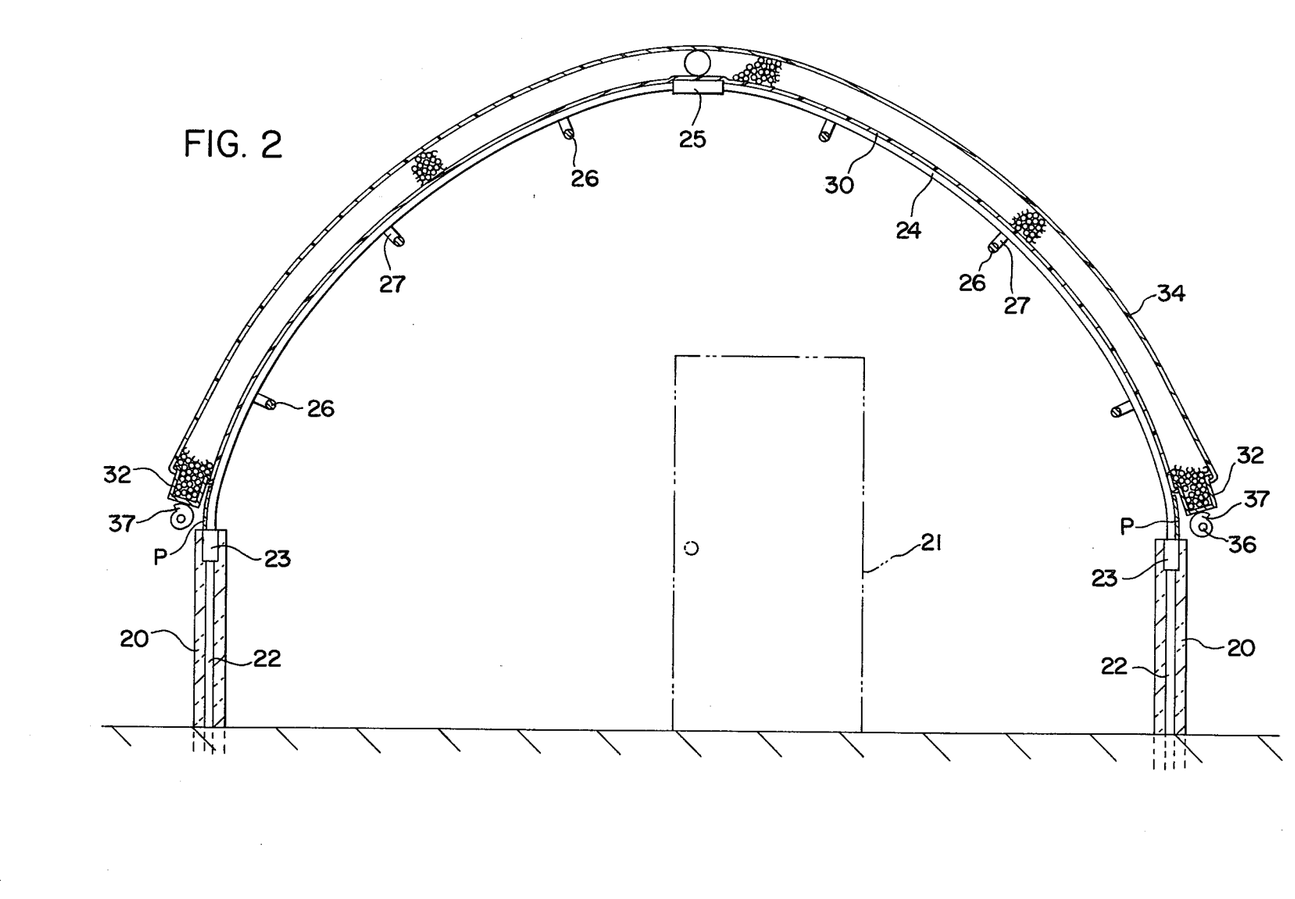
FIG. 2 is an enlarged cross-sectional view on line 2—2 of FIG. 1, showing the roof wall filled with particulate insulation material.
Figures 3, 6, 7, 8:
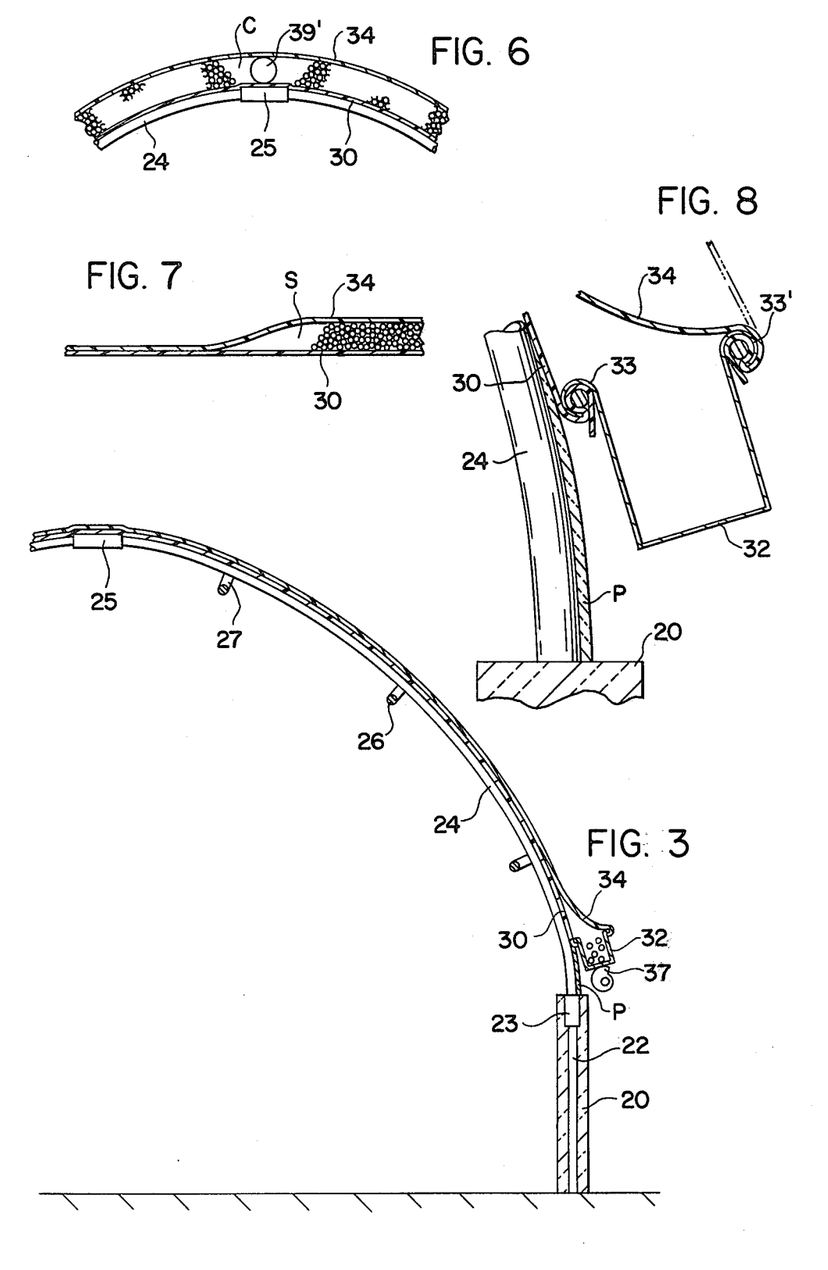
FIG. 3 is a partial view similar to FIG. 2, showing the wall empty and the outer layer collapsed.
FIG. 6 is a partial view similar to FIG. 2, taken on line 6—6 of FIG. 5, showing the wall filled except for an open channel along the top.
FIG. 7 is a partial sectional view on line 7—7 of FIG. 5, showing the wall partly evacuated and the outer layer collapsed on the evacuated portion.
FIG. 8 is an enlarged sectional view on line 8—8 of FIG. 5.

Referring to FIGS. 1-3, the two greenhouses indicated generally at No. 1 and No. 2 are of identical construction, each having a curved substantially cylindrical framework for supporting the roof, the framework being supported on a rectangular, vertically disposed wainscot wall 20,20' extending around the base. The wall 20 may comprise panels of thermal insulating moisture-proof material and may extend below the ground level, as indicated in FIG. 2, to inhibit heat loss from the greenhouse through the ground. The wainscot wall 20' preferably extends across the ends of the greenhouse, and is provided with doors 21 therein.

The wainscot wall 20 extending along the sides of each greenhouse has vertical pipes or tubes 22 enclosed therein at intervals longitudinally of the greenhouse and the tubes have coupling sleeves 23 on their upper ends. A series of tubular arches or bows 24 are supported at their lower ends in coupling sleeves and extend transversely of the greenhouse. These arches 24 may be in two sections joined together at the top by couplings 25. Preferably, there is an arch at each end of the structure, with the remaining arches spaced equally therebetween.

The arches 24 are preferably connected by purlin tubes 26 extending longitudinally of the structure to complete the framework for the roof, and, as indicated in FIGS. 2 and 3, the purlin tubes 26 are preferably spaced inwardly of the arches 24 by stub connectors 27, for a purpose to be described. The spaces between the end arches and the end walls 20' are closed by a glazing of glass or plastic sheeting 28 in a usual manner.

An inner flexible layer of plastic sheeting 30, such as polyethylene, is stretched over the arches 24 and secured thereto in a usual manner, as by clips (not shown). As best shown in FIG. 8, the bottom edge portions of the plastic layer 30 are secured to the inner edges of troughs 32 extending longitudinally of the framework just above the wainscot walls 20 on both sides of the structure. Thus, condensation on the inner surface of layer 30 will not drain into the troughs and wet the beads. The troughs 32 may be of sheet metal or plastic material having beaded edges 33 around which the marginal edges of the layer 30 are crimped. Preferably, the troughs are lined with thermal insulating material.

An outer flexible layer of plastic sheeting 34, which may be the same material as layer 30, overlays the layer 30 and has its lower edges secured to the outer beaded edges 33' of troughs 32. At the ends of the roof the layers 30 and 34 are sealed together in a well-known manner to provide a closed chamber between the layers. The arcuate length of the layer 34 is calculated to be such that when the chamber between the layers is inflated as in FIG. 2, the distance between layers is approximately 4 inches. As indicated in FIG. 3, when the chamber is deflated, the outer layer collapses upon the inner layer. Between the arches, the inner plastic layer bulges inward due to the air pressure from the blowers used to fill and empty the space between the layers. The purlin tubes 26 are spaced several inches inwardly from the arches 24 to prevent the plastic layer 30 from resting on the purlins and obstructing the smooth flow of the beads during the emptying cycle.

Figure 4:
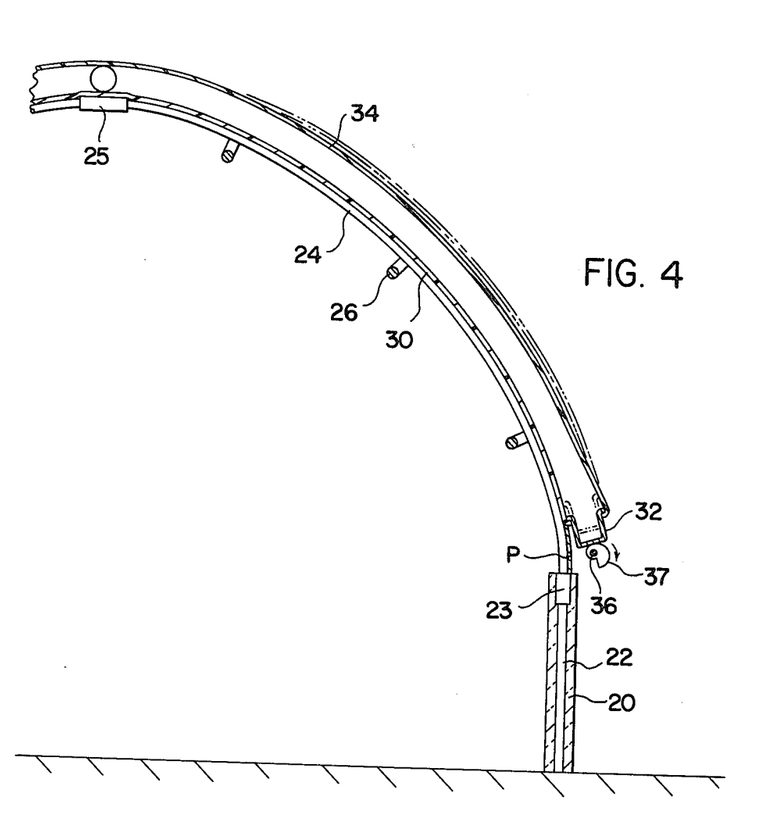
FIG. 4 is a view similar to FIG. 3, showing a movable connection between the bottom of the roof wall and the frame to compensate for expansion and contraction of the plastic layers.

The troughs 32 are preferably adjustably supported above the wainscot wall 20 to compensate for expansion and contraction of the plastic layers 30 and 34. Such a support may comprise rotatable rods 36 extending longitudinally under the troughs and having series of cams 37 thereon to raise and lower the troughs 32. Between each trough 32 and wall 20 is an insulated panel P which is attached to arches 24. This panel provides a smooth surface over which the trough may ride when removing slack from layers 30,34.

As shown in FIG. 1, air ducts 38 and 39 and 38' and 39' are connected into the chambers between the plastic layers 30 and 34 at opposite upper ends of the No. 1 and No. 2 structures. Air ducts 40 are connected into the front ends of troughs 32 in No. 1 structure, and air ducts 40' are connected into the rear ends of troughs 32 in No. 2 structure.

In accordance with the present invention, the chambers in the roof walls of the greenhouse structures are filled with granular thermal insulating material during the nighttime to conserve heat within the structures, and the insulating material is removed during the daytime to allow transmission of solar energy through the roof walls. A preferred thermal insulating material is expanded polystyrene beads which are preferably treated to inhibit static electricity tending to cause coagulation of the beads.

Figure 9:
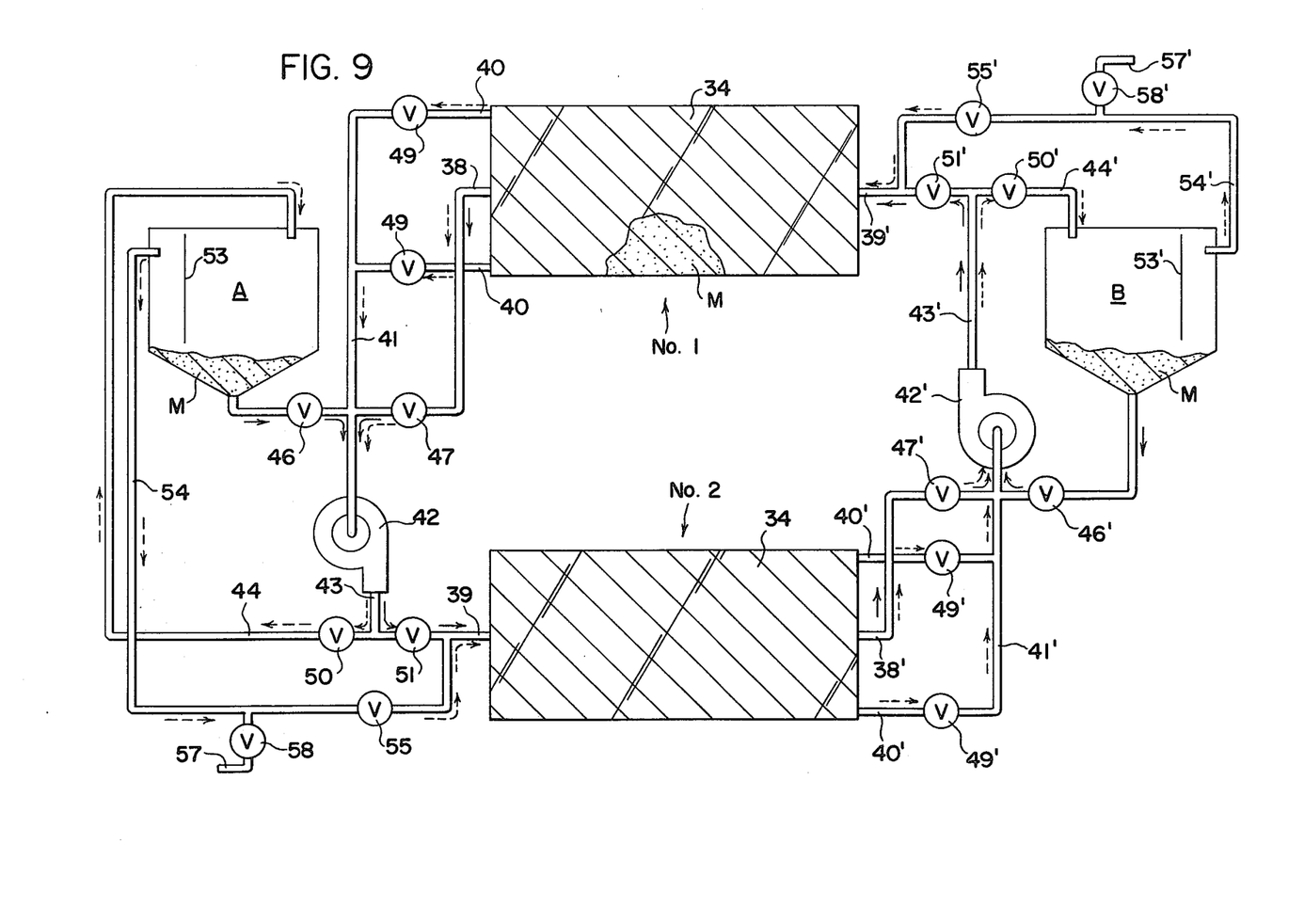
FIG. 9 is a schematic diagram of the fluid circulation system.
Figure 10:
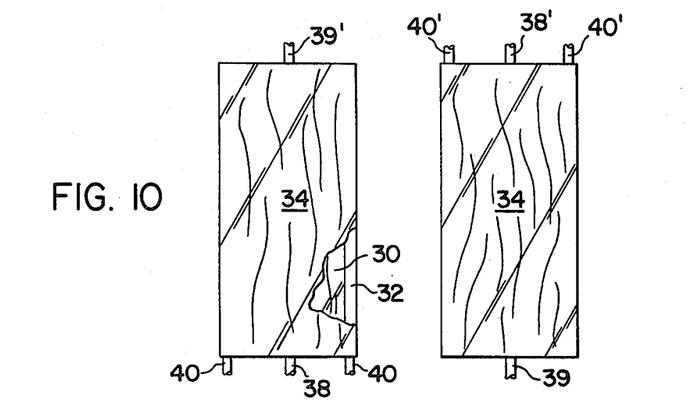
FIGS. 10-12 are schematic plan views showing stages of the filling operation.
Figure 11:
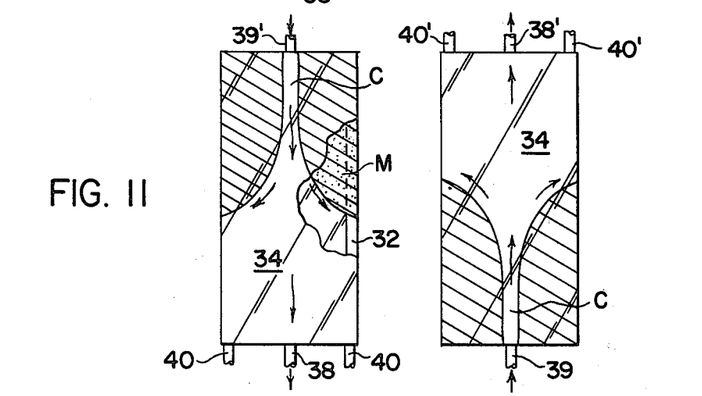
Figure 12:
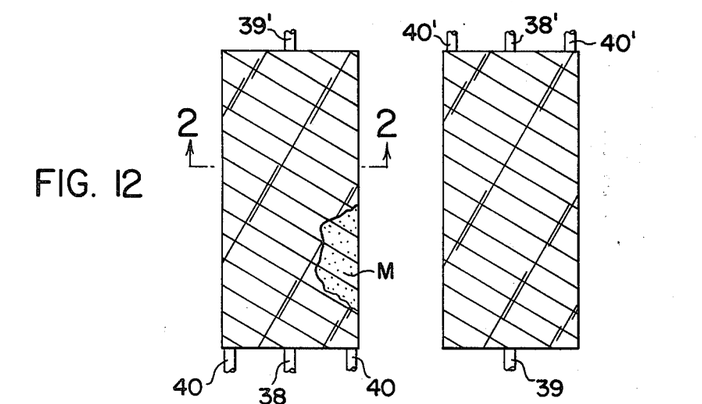
Figure 13:
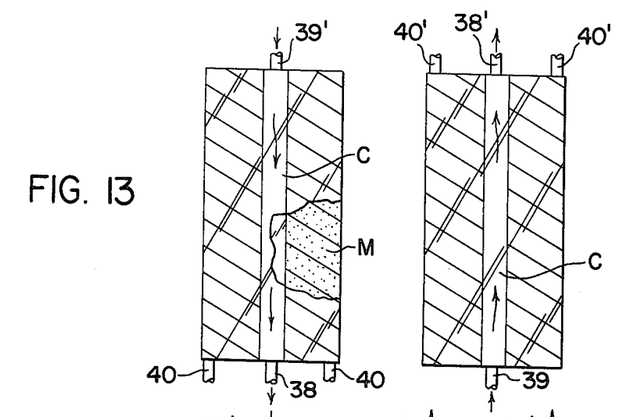
FIGS. 13-15 are schematic plan views showing stages of the emptying operation.
Figure 14:
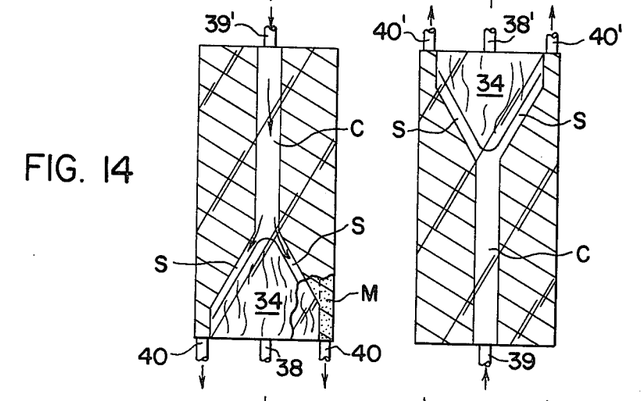
Figure 15:
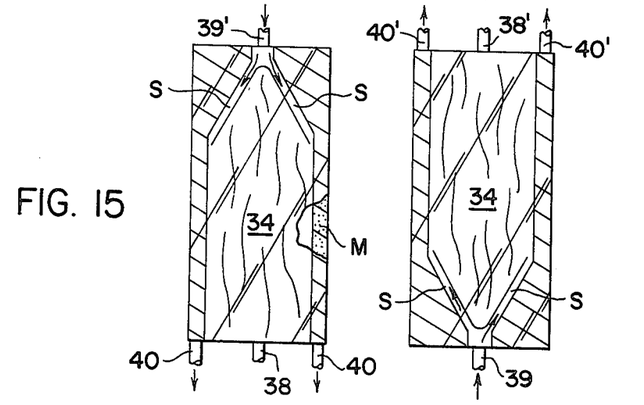

FIG. 9 shows schematically the fluid circulation system for inserting and removing the polystyrene beads into and from the chambers between the plastic layers comprising the roof walls of the No. 1 and No. 2 structures. Each air duct 38 and 38' is connected to the bottom of a bin for storing the beads when they are removed from the roof walls of the structures. Duct 38 from No. 1 structure is connected to the bottom of a bin A and duct 38' from No. 2 structure is connected to the bottom of a bin B. The ducts 40 from No. 1 structure are connected by a duct 41 to the supply port of a centrifugal blower 42, the exhaust port of which is connected by conduits 43 and 44 to the top of bin A. Similarly, the ducts 40' from No. 2 structure are connected by a duct 41' to the supply port of a blower 42', the exhaust port of which is connected by conduits 43' and 44' to the top of bin B. The bins A and B are substantially airtight.

The ducts 41 and 41' are also connected to the ducts 38 and 38', respectively, and butterfly valves 46 and 47 and 46' and 47' are provided in ducts 38 and 38', respectively, on opposite sides of their connections with ducts 41 and 41'. Valves 49 and 49' are provided in ducts 40 and 40', respectively. The ducts 39 and 39' are connected to the ducts 44 and 44', respectively, and valves 50 and 51 and 50' and 51' are provided in ducts 39 and 39' on opposite sides of the connections with ducts 43 and 43'.

In the operation of the improved system, assuming that the roof wall chambers of both structures are empty and the insulating material M stored in the bins, the filling operation will be described. The air flow during filling is indicated in FIG. 9 in solid line arrows and during emptying in broken line arrows. Before starting the blowers 42 and 42', valves 49 and 49' are closed, valves 46 and 46' and 47 and 47' opened, 50 and 50' closed, and 51 and 51' opened. When the blowers are started, material will be entrained in the air flow from bin A and conducted through conduits means 43 and 39 into the roof wall chamber of structure No. 2. The material will separate out in the chamber and fall down the sides into the troughs. The air will exhaust through duct 38' and valve 47' to the supply port of blower 42' so that the plastic layers will not be damaged by excess pressure. At the same time, material from bin B will be conducted through blower 42' and conduits means 43' and 39' into the roof wall chamber of structure No. 2, the air flow exhausting through duct 38 to blower 42, and the material separating out to fill the chamber of No. 2.

Figure 5:
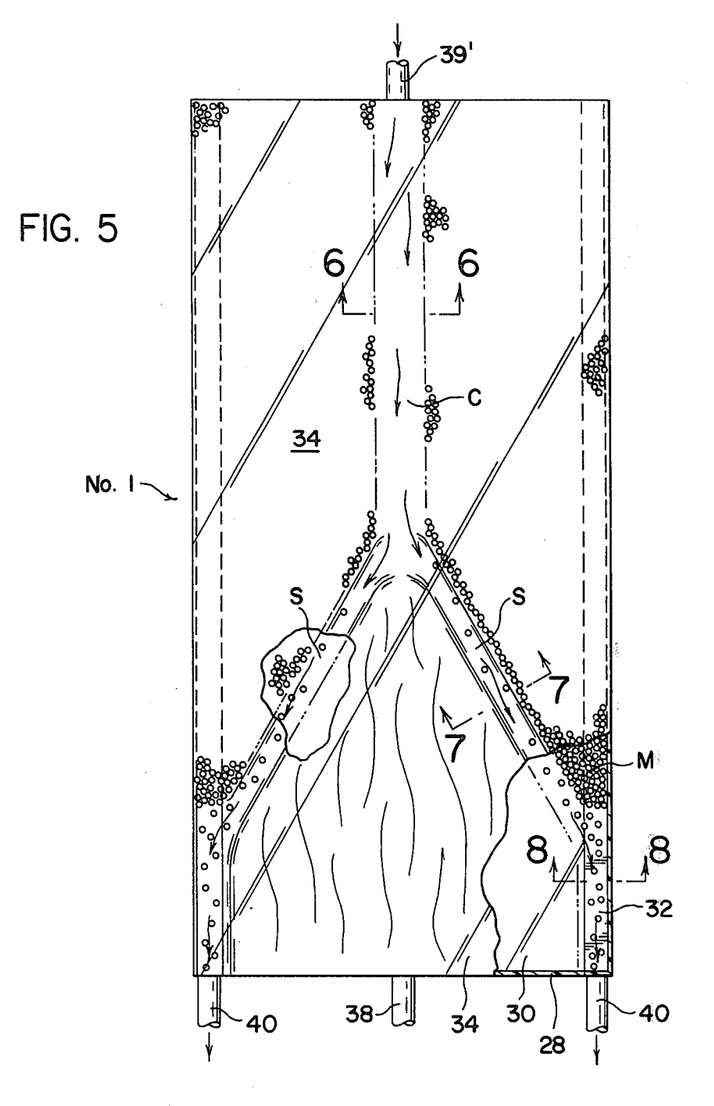
FIG. 5 is an enlarged schematic plan view of one of the greenhouse structures indicating the flow of air and insulating material during the emptying cycle.

When it is desired to remove the insulating bead material from the roof wall chambers, valves 46 and 46', 51 and 51' are closed, and valves means 50 and 50' are opened. When the blowers are started the air flow from the blowers through conduits 44 and 44' into bins A and B and out through conduits 54 and 54' will flow through the tops of the wall chambers and evacuate beads to form longitudinal air channels C through the chambers, as indicated in FIGS. 5 and 6. In bins A and B baffles 53 and 53' are provided to separate beads returned through conduits 44 and 44' from the air flowing into the bins and exhausting through outlet conduits 54 and 54'. The conduits 54 and 54' are connected to conduits 39 and 39', and have valves 55 and 55' therein. The valves 55 and 55' are also opened at the start of the emptying cycle.

When channels C have been formed to about two feet in width, valves 49 and 49' are opened, so that the blowers will draw the bead material M through ducts 40 and 40' to the bins A and B. This withdrawal action causes the air flow through each channel C to form two air streams S from the end of the channel to the ducts 40 at the ends of troughs 32, and the air streams entrain beads and peel them off of the aggregate M, as indicated in FIG. 5. As the beads are evacuated, the outer plastic layer 34 collapses progressively in a substantially triangular configuration onto the area of inner layer 30 from which the beads have been evacuated, and effectively shuts off flow from the channel C into the duct 38. Thus, it may not be necessary to close the valves 47,47' after the valves 49,49' are opened.

The ducts 54,54' are preferably provided with vents 57,57' leading to the atmosphere and having valves 58,58' therein, for reducing incoming air to the tops of the structures to allow the plastic layers 34 to collapse.

In order to insure the complete evacuation and filling of the beads, the curves of the arches 24 must be designed to allow free flow of the beads from the channels C downward into the troughs 32. The arches should be at an angle of at least 15° from the vertical at the exit channels to prevent the beads from piling up during filling and causing bulging out of the layers above the troughs.

It has been determined that the improved greenhouse structure and circulation system used in cold weather seasons results in a savings of 75% in heating fuel over a 24-hour period as compared with a greenhouse using an air chamber between two layers of plastic sheeting. Moreover, the cost of construction materials including the polystyrene beads is minimal, and the beads can be used continuously over long periods.

The structure and system is adapted for use in extremely hot weather by filling or partially filling the roof wall chamber with insulation beads during the daytime, thus eliminating the necessity of spraying the outer layer to reduce transmission of energy, or using curtains or other expedients. Also, during hot nights the insulating beads would reduce the energy required to circulate cool air within the structures.

I claim:

1. In combination, a greenhouse structure having a curved roof wall formed of two plastic film layers with an air space between them, at least the outer layer being flexible, a fluid circulation system having means for introducing insulation particles into said air space at one end of the top of said structure and means for evacuating said particles from the bottom sides of said air space at the other end of said structure, a longitudinal trough located between and attached to said plastic layers at the lower part of each side of said wall, whereby the inner layer when stretched presents inner surface to conduct condensation outside of the trough, and a storage enclosure connected in said circulation system for temporarily storing the evacuated insulation particles.

2. A greenhouse structure and fluid circulation system as in claim 1, wherein the means for evacuating said particles is connected to said troughs at said other end of said structure.

3. A greenhouse structure and fluid circulation system as in claim 1, wherein a second greenhouse structure is arranged adjacent to the first, and the fluid circulation system has duplicate means for introducing insulation particles into the top of said second structure and duplicate means for evacuating particles from the bottom sides thereof at its ends opposite to the respective ends of said first structure.

4. A greenhouse structure consisting of laterally extending spaced-apart arches supporting an air-inflated roof wall comprising spaced-apart layers of plastic, said arches connected together by inwardly spaced purlins under the inner plastic layer connected to said arches by stub connectors to prevent the inner plastic layer from contacting said purlins between said arches, and blower means selectively to introduce insulation particles into the space between said plastic layers and to evacuate air from between the plastic layers in order to collapse the outer plastic layer.

5. A greenhouse structure having a curved roof wall formed of two layers of plastic film with an air space between them, a fluid circulation system having conduit means for introducing insulation particles into said air space at one end of the top of said structure, and conduit means for evacuating said particles from the bottom sides of said air space at the other end of said structure, and valve means in said system to induce a longitudinal air channel through the particles in the top of the air space at the start of the evacuation of said particles so as to form downwardly extending particle-entraining air streams during evacuation.

6. A greenhouse structure and circulation system as in claim 1, wherein the troughs are adjustably mounted on the structure to compensate for expansion and contraction of said plastic layers.

7. The method of conserving heat within a greenhouse having a curved air-inflated roof wall formed by spaced-apart flexible plastic layers, comprising the steps of blowing insulation particles into the top of the wall at one end to completely fill the space between the layers during the nighttime, evacuating the particles progressively from one end to the other of said space into a storage enclosure during the daytime, inducing a longitudinal air channel through the particles in the top of the wall at the start of evacuation, and continuously withdrawing particles from the bottom sides of said curved wall to form particle-entraining air streams extending downwardly from said upper channel to said bottom sides, said downwardly extending air streams moving progressively longitudinally of said greenhouse and causing the outer plastic layer to collapse progressively behind said air streams as the particles are evacuated.

8. The method of claim 7, wherein a second greenhouse structure is arranged adjacent to the first, and the insulation particles are blown into and removed from the roof walls of both structures simultaneously from a common circulation system.

9. The method of conserving heat within a greenhouse as in claim 7, wherein the particles are evacuated from the bottom sides of said curved wall at the other end thereof.

* * * * *